US007590536B2

(12) United States Patent
Bates et al.

(10) Patent No.: US 7,590,536 B2
(45) Date of Patent: Sep. 15, 2009

(54) VOICE LANGUAGE MODEL ADJUSTMENT BASED ON USER AFFINITY

(75) Inventors: Cary L. Bates, Rochester, MN (US); Brian P. Wallenfelt, Rochester, MN (US)

(73) Assignee: Nuance Communications, Inc., Burlington, MA (US)

( * ) Notice: Subject to any disclaimer, the term of this patent is extended or adjusted under 35 U.S.C. 154(b) by 500 days.

(21) Appl. No.: 11/246,831

(22) Filed: Oct. 7, 2005

(65) Prior Publication Data

US 2007/0083374 A1 Apr. 12, 2007

(51) Int. Cl.
*G10L 15/06* (2006.01)

(52) U.S. Cl. ....................... 704/244; 704/231; 704/243; 704/257

(58) Field of Classification Search ................. 704/257, 704/263, 266, 270.1, 255, 275, 277, 231, 704/243–245

See application file for complete search history.

(56) References Cited

U.S. PATENT DOCUMENTS 5,005,203 A 4/1991 Ney
5,640,485 A * 6/1997 Ranta ......................... 704/251
6,017,219 A 1/2000 Adams, Jr. et al.
6,029,135 A 2/2000 Krasle
6,122,361 A 9/2000 Gupta
6,192,337 B1 * 2/2001 Ittycheriah et al. .......... 704/231
6,243,677 B1 * 6/2001 Arslan et al. ................ 704/244
6,260,194 B1 7/2001 Shiels et al.
6,345,249 B1 2/2002 Ortega et al.
6,349,307 B1 2/2002 Chen
6,363,348 B1 3/2002 Besling et al.
6,421,640 B1 7/2002 Dolfing et al.
6,456,975 B1 * 9/2002 Chang ...................... 704/270.1
6,484,136 B1 * 11/2002 Kanevsky et al. .............. 704/9
6,487,534 B1 11/2002 Thelen et al.
6,526,380 B1 2/2003 Thelen et al.
6,690,918 B2 2/2004 Evans et al.

(Continued)

FOREIGN PATENT DOCUMENTS

EP 1435605 A2 * 7/2004

OTHER PUBLICATIONS

E. Eskin, "Anomaly detection over noisy data using learned probability distributions," in Proc. 17th Int. Conf. Machine Learning, San Francisco, CA, 2000, pp. 255-262.*

(Continued)

*Primary Examiner*—David R Hudspeth
*Assistant Examiner*—Edgar Guerra-Erazo
(74) *Attorney, Agent, or Firm*—Wolf, Greenfield & Sacks, P.C.

(57) ABSTRACT

Methods, systems and computer readable medium for improving the accuracy of voice processing are provided. Embodiments of the present invention generally provide methods, systems and articles of manufacture for adjusting a language model within a voice recognition system. In one embodiment, changes are made to the language model by identifying a word-usage pattern that qualifies as an anomaly. In one embodiment, an anomaly occurs when the use of a given word (or phrase) differs from an expected probability for the word (or phrase), as predicted by a language model. Additionally, observed anomalies may be shared and applied by different users of the voice processing system, depending on an affinity in word-usage frequency between different users.

6 Claims, 7 Drawing Sheets

U.S. PATENT DOCUMENTS

| | | | |
|---|---|---|---|
| 6,718,304 B1 | 4/2004 | Tachimori et al. | |
| 6,754,626 B2 | 6/2004 | Epstein | |
| 6,801,893 B1 | 10/2004 | Backfried et al. | |
| 6,823,307 B1 | 11/2004 | Steinbiss et al. | |
| 6,941,264 B2 * | 9/2005 | Konopka et al. | 704/243 |
| 6,993,475 B1 * | 1/2006 | McConnell et al. | 704/7 |
| 2002/0111806 A1 * | 8/2002 | Franz et al. | 704/255 |
| 2002/0143532 A1 | 10/2002 | McLean et al. | |
| 2002/0188451 A1 | 12/2002 | Guerra et al. | |
| 2003/0050075 A1 | 3/2003 | Rangarajan et al. | |
| 2003/0144837 A1 | 7/2003 | Basson et al. | |
| 2003/0182132 A1 | 9/2003 | Niemoeller | |
| 2004/0049388 A1 | 3/2004 | Roth et al. | |
| 2004/0064450 A1 | 4/2004 | Hatano et al. | |
| 2004/0153306 A1 | 8/2004 | Tanner et al. | |
| 2005/0216264 A1 * | 9/2005 | Attwater et al. | 704/239 |
| 2005/0234724 A1 * | 10/2005 | Aaron et al. | 704/260 |
| 2006/0190258 A1 * | 8/2006 | Verhasselt et al. | 704/255 |

OTHER PUBLICATIONS http://www.programmingresources.com/speechrecognition.html, "Speech Recognition", printed Nov. 19, 2004, date unknown.

* cited by examiner

VOICE LANGUAGE MODEL ADJUSTMENT BASED ON USER AFFINITY

BACKGROUND OF THE INVENTION

1. Field of the Invention

Embodiments of the present invention generally relate to the field of voice processing. In particular, embodiments of the invention are related to methods, systems, and articles of manufacture used to improve the accuracy of speech recognition software.

2. Description of the Related Art

Voice processing systems are used to translate dictated speech into text. Typically, voice processing systems monitor the sound patterns of a user's speech and match them with words using a predefined dictionary of sound patterns. The result is a prediction of the most probable word (or phrase) that was dictated. For example, voice processing software may receive input from a microphone attached to a computer. While the user speaks into the microphone, the voice processing system translates the user's voice patterns into text displayed on a word processor. Another example includes a business call center where callers navigate through a menu hierarchy using verbal commands. As callers speak into the telephone receiver, an automated agent attempts to translate the caller's spoken commands, and initiate some action based thereon.

One goal for a voice processing system to operate at a rate comparable to the rate at which a user is speaking. Matching a given voice pattern to the words in a large predefined dictionary, however, can be time consuming and require substantial computational resources. Another goal of a voice processing system is to maximize accuracy, or conversely, to minimize errors in word translation. An error occurs when the voice processing system incorrectly translates a voice pattern into the wrong textual word (or phrase). Such an error must be manually corrected, forcing the user to interrupt a dictation session before continuing. Therefore, to maximize the usefulness of the voice processing system it is desirable to minimize such errors. These two goals conflict, however, as greater accuracy may cause the voice processing system to lag behind the rate at which a user dictates into the voice processing system.

As stated, speech recognition is a computationally intense task. For example, sound patterns may be measured using 10 to 26 dimensions or more, and then analyzed against the words in the dictionary. Thus, accuracy in speech recognition may be sacrificed for speed of execution. For example, many voice recognition systems use a tiered approach to word selection. A first tier, often referred to as a "fast match," produces a very rough score used to select a set of candidate words (or phrases) corresponding to a given sound pattern. The voice recognition system then uses a language model to select the probability that a particular word (or phrase) was spoken. The speech recognition software reduces the set produced by the "fast match," based on what the language model determines is likely to have been spoken. This reduced set is passed to a much slower "detailed match" algorithm, which selects the best word (or phrase) from the reduced set, based on the characteristics of the voice pattern.

Additionally, many fields (e.g., the legal and medical professions), have their own distinct vocabulary. Accordingly, one approach to defining a language model has been to provide a special dictionary that contains some additional industry terms. Further, the probability of particular words being spoken may be adjusted within the language model for a group of professionals in a given field. Thus, these approaches improve the accuracy of a voice recognition system, not by providing a better understanding of a speaker's voice patterns, but by doing a better job of understanding what the speaker is likely to say (relative to what has already been said). Similarly, many voice processing systems also provide a feature configured to scan documents authored by a given user, and adjust the language model to more accurately calculate how often a word is likely to be spoken by that given user.

Currently, the most common language models are n-gram models, which assume that the probability of a word sequence can be decomposed into conditional probabilities for a given word, based on the words that preceded it. In the context of an n-gram language model, a trigram is a string of three consecutive words. Similarly, a bigram is a string of two consecutive words, and a unigram is a single word. The conditional probability of a trigram may be expressed using the following notation: Prob (w1, w2, w3), which may be interpreted as "the probability that the word w3 will follow the words w1 and w2, in order."

Thus, in some cases even if a given voice pattern may provide an excellent match for an uncommonly used word (or phrase), the system may select an inferior match with a higher probability in the n-gram language model. For example, even though a voice pattern may match a word like "Muskie" better than it matches "must be", the probability that "must be" will be dictated is so much higher, that a language model whose probabilities are not correctly adjusted for the current real life situation may actually discard (or not select) "Muskie" when the voice system reduces the set produced by the fast match. Another simple example includes a user dictating the word "Ivan;" the voice processing system may incorrectly translate the voice pattern using another, more probable, word in the dictionary such as "I've been".

Accordingly, even using the n-gram language model with the adjustments described above, voice recognition systems still produce a substantial number of mismatches between voice patterns and the resulting translated text. Therefore, there remains a need for methods that will improve the accuracy of a voice recognition system.

SUMMARY OF THE INVENTION

The present invention generally relates to a method, a computer readable medium, and a computer system for improving the accuracy of word recognition in a voice processing system.

One embodiment of the invention provides a method for increasing the accuracy of a voice recognition system. The method of generally includes initiating a voice processing session for a first user, wherein the voice processing session is configured to match a voice pattern derived from one or more words spoken by the first user with entries in a word-usage probability table, based on the probability of the one or more words being spoken by the first user, and during the voice processing session initiated for the first user, monitoring for an occurrence of a word-usage anomaly, wherein the word-usage anomaly occurs when an observed usage frequency for a given one or more words differs, by a predetermined magnitude, from an expected frequency recorded in the word-usage probability table for the given one or more words. In response to the word usage anomaly, the method generally further includes, increasing the expected frequency for the given one or more words in the word-usage probability table, and transmitting an indication of the observed anomaly to a voice processing session initiated for a second user.

Another embodiment of the invention provides a computer-readable medium, containing a program, which when executed on a computer system performs operations for increasing the accuracy of a voice recognition system. The operations generally include initiating a voice processing session for a first user, wherein the voice processing session is configured to match a voice pattern derived from one or more words spoken by the first user with entries in a word-usage probability table, based on the probability of the one or more words being spoken by the first user. The operations generally further include during the voice processing session initiated for the first user, monitoring for an occurrence of a word-usage anomaly, wherein the word-usage anomaly occurs when an observed usage frequency for a given one or more words differs, by a predetermined magnitude, from an expected frequency recorded in the word-usage probability table for the given one or more words. In response to the word usage anomaly, the operations may include increasing the expected frequency for the given one or more words in the word-usage probability table, and transmitting an indication of the observed anomaly to a voice processing session initiated for a second user.

Another embodiment provides a system configured to increase the accuracy of voice recognition session. The system generally includes a memory containing a program, which when executed by the computing operations. The operations may include initiating a voice processing session for a first user, wherein the voice processing session is configured to match a voice pattern derived from one or more words spoken by the first user with entries in a word-usage probability table, based on the probability of the one or more words being spoken by the first user. The operations generally further include, during the voice processing session initiated for the first user, monitoring for an occurrence of a word-usage anomaly, wherein the word-usage anomaly occurs when an observed usage frequency for a given one or more words differs, by a predetermined magnitude, from an expected frequency recorded in the word-usage probability table for the given one or more words. In response to the word usage anomaly, the operations may include, increasing the expected frequency for the given one or more words in the word-usage probability table, and transmitting an indication of the observed anomaly to a voice processing session initiated for a second user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof, which are illustrated in the appended drawings.

Note, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention generally provide methods, systems and articles of manufacture for adjusting a language model within a voice recognition system. In one embodiment, changes are made by identifying a word-usage pattern that qualifies as an anomaly. Typically, an anomaly occurs when the use of a given word (or phrase) departs from an expected probability for the word (or phrase), as predicted by a language model. As used herein the term "word" may refer to a single word in a given language, but also a phrase of words connected in particular sequence. Additionally, the expected probability for a word is typically determined using a bi-gram, tri-gram, or more generally, n-gram, language model.

When a client observes a word-usage anomaly, the voice recognition system may be configured to share the anomaly with other clients. For example, a voice recognition system configured according to the present invention may detect when the use of an uncommon word (or phrase) changes to the extent it becomes a common word (or phrase). In response, the word may be identified as an anomaly and transmitted to a centralized server for broadcast to other clients that are using the voice recognition system. Alternatively, clients in a distributed voice processing environment may distribute anomalies to one another in a peer-to-peer manner.

In either case, once received, a client may elect to adjust a local language model to reflect the anomaly (e.g., the client may increase the word-usage probability for the identified anomaly to ensure it will not be excluded as part of a "fast-match"). Further, because an anomaly may be short lived, any adjustments made to the language model based on an identified anomaly may set to expire after a given period, or to decay over time, if the anomalous word-usage does not continue to occur.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
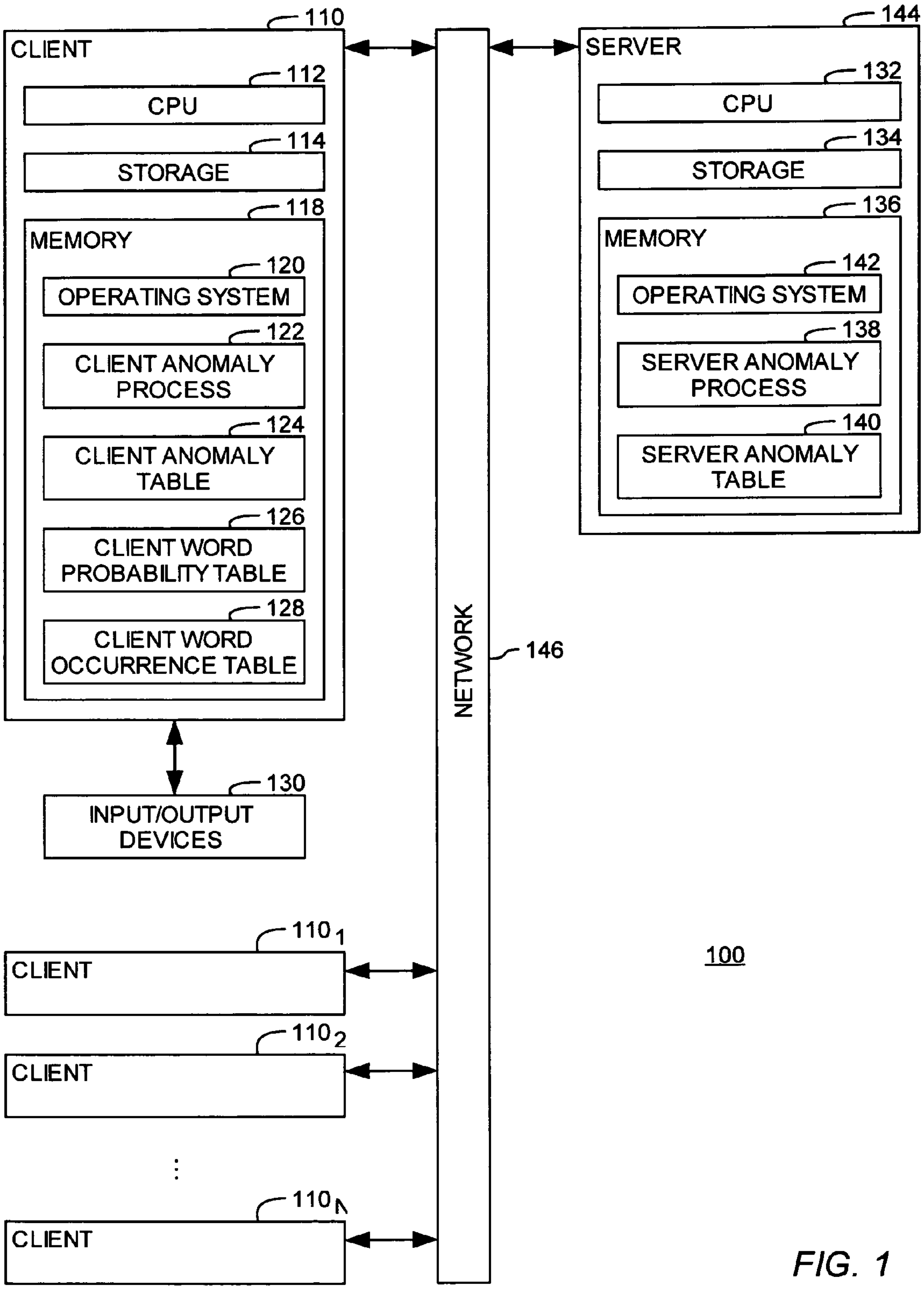
FIG. 1 is depicts a block diagram of a distributed computer system used to provide voice recognition services, according to one embodiment of the invention.

One embodiment of the invention is implemented as a program product for use with a computer system such as, for example, the network environment 100 as shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. Computer programs that implement the present invention typically include many instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 depicts a block diagram of a distributed computer system 100 used to provide voice recognition services, according to one embodiment of the invention. Illustratively, the distributed computer system, or network 100 contains a plurality of users or client systems 110, a data communication network 146, and one or more servers systems 144. Each client system 110 may be one or more hardware devices, e.g., a computer, a cell phone, a personal digital assistant (PDA). Further, each client 110 may include software applications (e.g., client anomaly process 122) executing on existing computer systems. The voice recognition system and voice recognition techniques described herein, however, are not limited to any currently existing computing environment, and may be adapted to take advantage of new computing systems, platforms, or devices as they become available.

In one embodiment, client systems 110 may be configured to communicate with one or more servers 144 over network 146. A server system 144 may include a central processing unit (CPU) 132, storage 134, and memory 136 (e.g., random access memory, read only memory, and the like). Memory 136 may contain an operating system 142, a voice recognition process 138 and table 140. A description of the voice recognition process 138 and table 140 is provided in greater detail below.

Similarly, the clients 110-110$_n$ may each comprise a computer having a central processing unit (CPU) 112, storage 114, and memory 118 (e.g., random access memory, read only memory, and the like). The memory 118 may be loaded with an operating system 120, a client anomaly process 122, a client anomaly table 124, and a client word probability table 126, and client word occurrence table 128. Additionally the client 110 may be coupled to a plurality of peripheral devices 130. The peripheral devices 130 may include, but are not limited to, a plurality of physical devices to capture a user's voice patterns (e.g., a microphone or microphones, sound cards, telephone receiver, etc).

Figure 2:
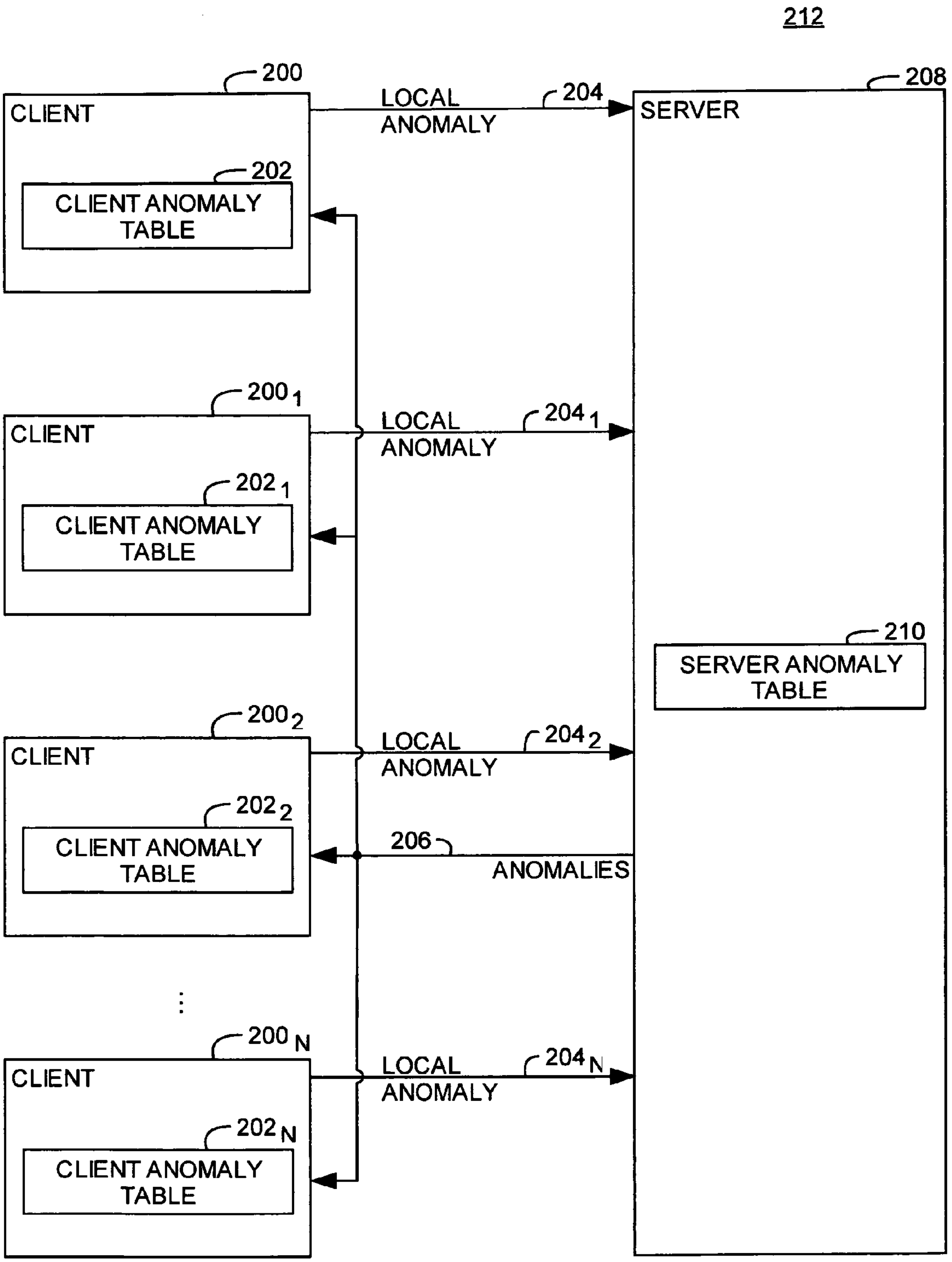
FIG. 2 is a block diagram further illustrating a distributed computing environment, according to one embodiment of the invention.

FIG. 2 illustrates a distributed voice recognition system, according to one embodiment of the invention. As illustrated, clients 200 are each executing a voice processing task. In general, a user engages in a voice processing session by speaking into a microphone or other sound recognition device 130. In response, the voice processing task parses the speaker's voice patterns and compares them with a dictionary of patterns provided by the voice recognition system.

In one embodiment, the dictionary provides a text representation of sound patterns (e.g., a word or phrase, depending on the n-gram model being used). Often, however, a given sound pattern may be similar for different spoken words such as "Ivan" or "I've been". In this situation, to determine the word to be outputted, the voice recognition system may rely on the probability of a word's occurrence based on the occurrence of the words that preceded it. That is, it may employ an n-gram model to select a set of words for a detailed (and time-consuming) pattern analysis, based on the probability predicted by the n-gram model. In the example above, "I've been" will be selected for a detailed analysis over "Ivan", because it is more probable that "I've been" was spoken than "Ivan".

Sometimes, the frequency at which a given word is used may rapidly change. Oftentimes, this may be precipitated by some external event. In voice processing systems, this may be referred to as an anomaly, i.e., a word (or phrase) suddenly being used more frequently than predicted by a given language model. For example, before hurricane Ivan hit the Florida coastline in September of 2004. The word "Ivan" would likely have a low probability score in the language model used in most voice recognition systems. However, for at least some cohorts, during and after September of 2004 the use of the word "Ivan" became much more frequent. Consequently, users of voice processing systems experienced errors (an error being a manual correction of the text that is output by the voice processing system) related to the word "Ivan." As described above, the sudden change in frequency of use of the word "Ivan" from a low probability to a higher probability may be referred to as an anomaly.

This example demonstrates the desirability for a voice processing software to detect a sudden change in the use of a historically uncommon word or phrase (e.g., "Ivan"), and to dynamically adjust the probabilities of that word in the language model being used by the voice processing system. As a result of implementing such detection and adjustment, the number of errors that occur during a voice recognition session may be decreased. Additionally, after some amount of time the language model may dynamically re-adjust the probability if the frequency of use of the anomaly word again becomes infrequent.

In one embodiment, once an anomaly is identified by a client 200$_1$, (e.g., when a sudden change in the frequency of a given word occurs) it may be distributed to other clients 200$_2$-200$_n$. For example, consider an insurance company using a large telephone network to process insurance claims. On this network, voice processing clients 200 may process an incoming call based on a person stating a desire to initiate a new claim against a homeowner's policy. After the hurricane of 2004, as people called in and spoke the word "Ivan," it is desirable for such a system to adjust to the sudden increase in the word-usage of the word "Ivan." In one embodiment, once a client 200 identifies an anomaly 204, it may be stored in local client anomaly table 202, and sent to server 208. Moreover, as many clients 200 observe the same anomaly, the server 208 may also communicate that the anomaly is being widely observed by many clients 200. This server 208 may be configured to store the anomaly in the server anomaly table 210 and to broadcast the anomaly to other clients 200. Alternatively, the clients 200 may be configured to distribute anomalies to one another in a peer-to-peer manner.

In response, remote clients 200$_1$-200$_n$ would then update anomaly tables 202 to reflect an increased probability of a caller speaking the word "Ivan." Similarly, a voice recognition system used by a representative of the insurance company, such as an adjuster dictating claims, will also observe the anomaly. In one embodiment, the anomaly may be provided to the voice recognition system used by the adjuster, before the anomaly is ever observed. Thus, the system will account for sudden changes in word-usage patterns without a user having to first correct a number of errors.

Furthermore, clients 200 may be configured to determine what action to perform regarding an anomaly 206 broadcast by server 208. For example, client 200$_1$ may chose to adjust the probability of occurrence of a word only once the anomaly has been observed by a number of other clients 200. Alternatively, a client may determine how often two clients observe the same anomaly before adjusting a word-probability table. In one embodiment, this determination may be based on a correlation score, representing an affinity in word usage between the client(s) that observed the anomaly and the client receiving the anomaly.

Figure 3:
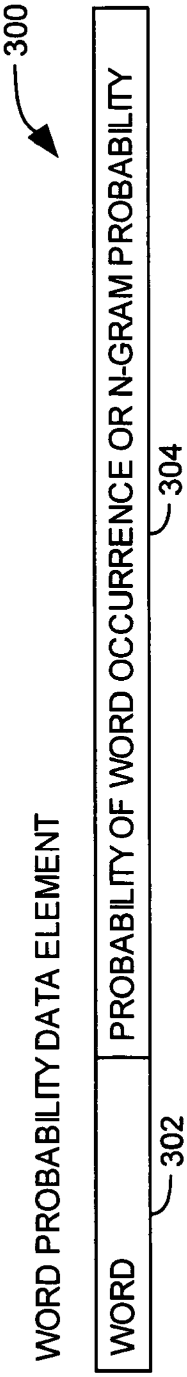
FIG. 3 illustrates an embodiment of a word probability data element.
Figure 4:
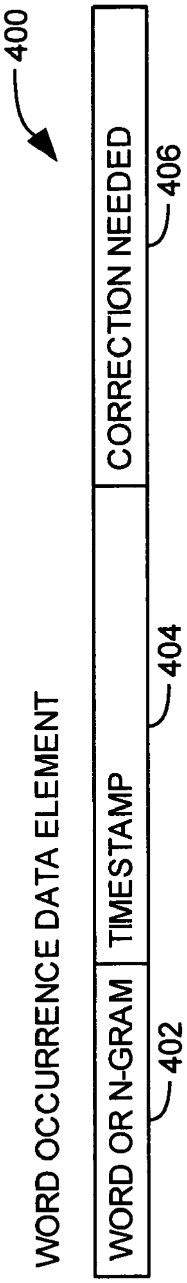
FIG. 4 illustrates an embodiment of a word occurrence data element.
Figure 5:
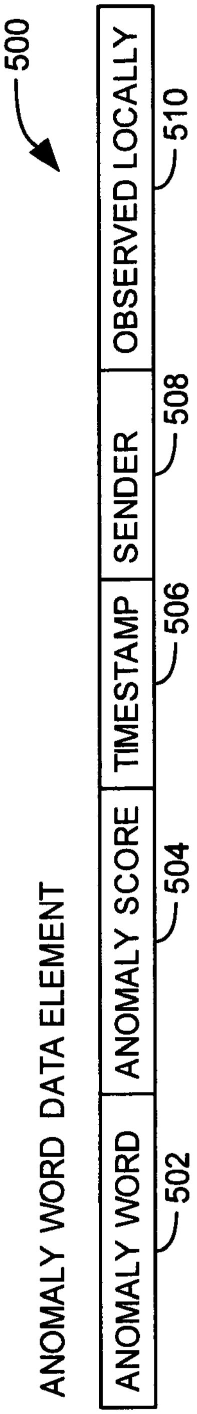
FIG. 5 illustrates an embodiment of a voice-processing anomaly data element.

FIGS. 3-5 illustrate data tables used to store and manage information related to anomalous word-usage patterns that may occur while a user interacts with a voice recognition system. Thereafter, FIGS. 7-12 illustrate a number of exemplary methods to observe, process, and share word-usage anomalies using the data structures illustrated in FIGS 3-5.

FIG. 3 shows one embodiment of a row 300 in a word-usage probability table 126. Illustratively, the row 300 comprises a word entry 302 and a probability of word occurrence entry 304. The word entry 302 is a word (or phrase) that may be dictated by a user interacting with a client 200 of a voice processing system. The word entry 302 may include both a text representation of the word (or phrase) along with a corresponding voice pattern. Each word entry 302 in the word probability table is unique as to other words in the table. However, many words (or phrases) may share similar (or the same) voice patterns. The usage-probability entry 304 represents the probability that a given voice pattern corresponds to the word (or phrase) specified by word entry 302. In one embodiment, the word probability 304 is based on an n-gram model that predicts the probability of the word entry 302, based on one or more preceding words.

FIG. 4 shows one embodiment of a row 400 in a word occurrence table 128. In one embodiment, the word occurrence table 128 may maintain a history of the words translated by the voice processing system for a particular user. Illustratively, a row 400 may include a word entry 402, a time stamp entry 404, and a correction needed entry 406. Each word entry 402 represents a word spoken by the user into the microphone or other peripheral input device 130, and subsequently translated by the voice processing system. The time stamp entry 404 indicates when a word was processed by the voice processing system. The correction needed entry 406 indicates an incorrect classification of a voice pattern that required correction by a user. For example, the voice processing software may be able to detect when a user corrects a word selected by the voice processing software. In addition to recording that a word required correcting, the "word correction needed" entry may include the corrected word entered by a user.

FIG. 5 shows one embodiment of a row 500 in a client anomaly table 124. Similarly, a server 208 may share the format of the client anomaly 124 table in server anomaly table 140. Illustratively, the row 500 includes information maintained by the client anomaly process 122 used to detect an anomalous word-usage event and to communicate locally observed anomalies 204 to a server 208. In one embodiment, a sever 208 may be configured to broadcast a word-usage anomaly to clients 200. For example, when a client 200 is being initialized, it may be configured to request data regarding any recently observed anomalies of which the client 200 may be unaware. Additionally, when a client 200 observes a word-usage anomaly, it may send an indication of same to other clients 200 in a peer-to-peer manner.

The row 500 is shown to include an anomaly word entry 502, an anomaly score entry 504, a time stamp entry 506, a sender entry 508, and an observed locally entry 510. The anomaly word entry 502 is populated when the client anomaly process 122 detects an anomaly and records the word (or phrase) identified as an anomaly, in the field. The other entries in the row 500 identify characteristics of a word-usage anomaly. These fields may be used to record a correlation score of the anomaly 504, a time stamp 506 indicating when the anomaly was observed, the identity of the client sending the anomaly 508, and an indication of whether the anomaly has been observed locally 510 by a given client 200. In addition, a server 208 may also use such a row 500 in the server anomaly table 140.

Figure 6:
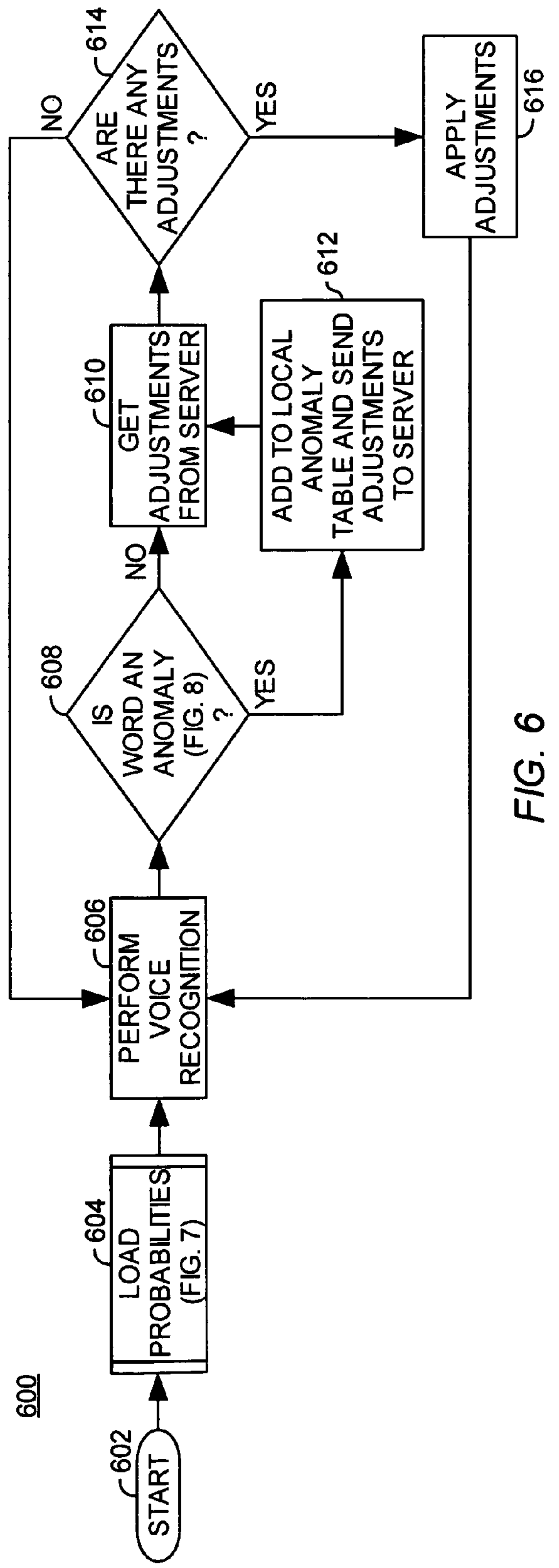
FIG. 6 is a flow chart illustrating a method for detecting and processing word-usage anomalies that may occur during the use a voice processing system, according to one embodiment of the invention.

FIG. 6 illustrates a method 600 for engaging in a voice recognition session, according to one embodiment of the invention. The method 600 begins at 602 when an individual begins using a voice recognition system. At step 604, word probabilities are loaded into a word probability table 126. In one embodiment, the word-usage probabilities may be tailored according to a specialized dictionary or by an analysis of the historical word-usage for a given user.

Next, step 606 illustrates the primary function of a voice recognition system executing on client 200: translating words dictated by a user into a representation of the words, based on an analysis of the user's voice patterns. For example, the voice processing system may provide text values to a word processor or other software, or perform various functions on behalf of a user interacting with a call-center. Thus, step 606 represents a dynamic step, wherein the voice recognition system continually translates speech into text. While doing so, the voice recognition system may perform a variety of additional actions. For example, during the voice processing step 606, the system may periodically perform steps 608-612 to update the language model, based on the occurrence of an anomaly (whether observed locally, or received from server 208).

At step 608, the client 200 determines whether an anomaly has occurred. That is, the system determines whether the actual word usage of a particular word (or phrase) is occurring at a substantially greater frequency than predicted by table 126 (e.g., the example relating to "I've been" and "Ivan" described above). Because, by definition, such events should be infrequent, the process may only occur periodically (e.g., once every hour, or once every 1000 word translations). One embodiment of a method for detecting a word-usage anomaly is described below in reference to FIG. 8.

At step 612, if the query performed at step 608 determines that a word-usage of given word is an anomaly, then the word may be recorded in the client anomaly table 124 and transmitted to the server 208, along with data related to the word-usage anomaly to populate the fields in a row of data table 500. At step 610, the client may receive anomalies 204 that have been observed by other clients 200 (e.g., from server 208 or directly from other clients 200). Returning to step 608, if the client 200 determines that a word under consideration is not an anomaly (e.g., if a word translation required correction in an isolated case), then the method proceeds to step 610 where the client receives anomalies 204 from the server 208 that have been observed by other clients 200. The actions of step 610 are described further in reference to FIG. 11.

At step 614, the client 200 performs a query to determine whether the server 208 has provided data related to word-usage anomalies observed by other clients. If the query at step 614 determines that no anomalies have been reported by other clients, the method 600 returns to step 606 where the voice processing system may continue to translate dictation. Otherwise, the method 600 proceeds to step 616 and the client 200 records the word-usage anomalies received from the server 208 in the local client anomaly table 124. These word-usage anomalies may be used to modify the current language model and word-usage probabilities used by client 200. By adjusting a local language model used by a client $\mathbf{200}_1$ to reflect anomalous word-usage observed at clients $\mathbf{200}_{2\text{-}n}$, the accuracy of the voice recognition system may be improved. One embodiment of a method for a client $\mathbf{200}_1$ to process word-usage anomalies observed at other clients $\mathbf{200}_{2\text{-}N}$ is described further in reference to FIG. 9.

Figure 7:
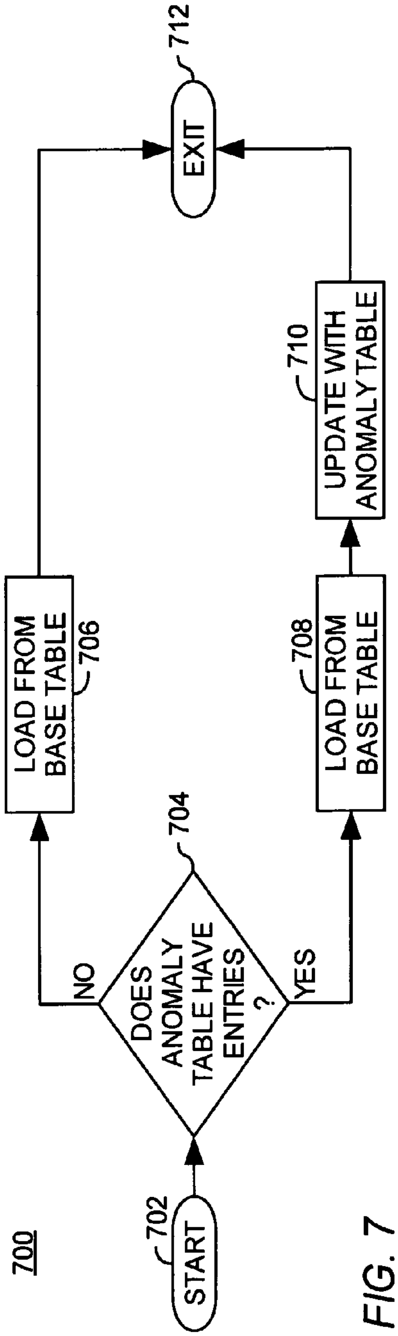
FIG. 7 is a flow chart illustrating a method for loading word probability tables, according to one embodiment of the invention.

FIG. 7 illustrates a method for initializing word-usage probability data on a client system 200, according to one embodiment of the invention. The method 700 further illustrates actions performed as part of step 604 of method 600. The method 700 begins at step 702, where a client 200 determines whether anomaly table 124 has any entries. That is, the client 200 determines whether a base language-model should be adjusted to reflect any current word-usage anomalies. If so, then the method 700 proceeds to step 708 and updates data for word-usage probability table 126 to reflect the word-usage probability of an anomaly.

As described above, the word-usage probability table 126 may include word entries 302, along with n-gram probabilities predicting the word-usage probability for the word entry 302. After the table 126 is initialized, at step 708, the method 700 proceeds to step 710 where the table 126 may be updated with entries from the client anomaly table 124. The client 200 performs step 710 to adjust the word-usage probability table 126 to reflect an observed anomaly when processing dictation. After completing step 710, the method 700 terminates at step 712.

Returning to step 704, if a local anomaly table 124 has no entries, then the method 700 proceeds to step 706. In step 706, the word-usage probability table 126 is loaded using default word-usage probabilities (e.g., using a standard word-probability dictionary or a specialized dictionary associated with a particular user). After step 706, the method 700 terminates at step 712.

Figure 8:
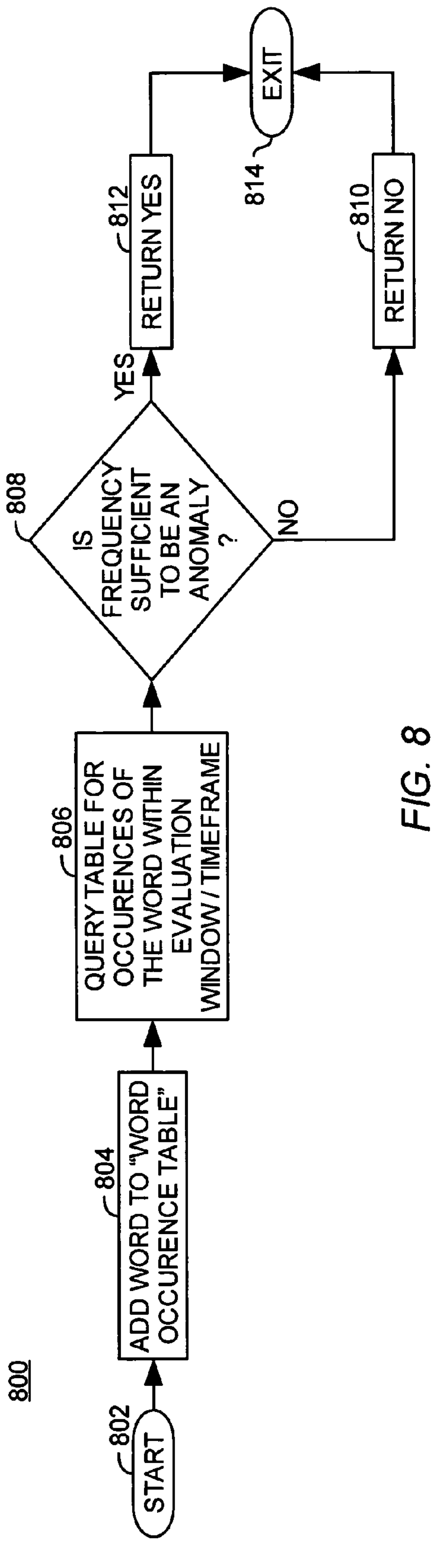
FIG. 8 is a flow chart illustrating a method for detecting word-usage anomalies, according to one embodiment of the invention.

FIG. 8 illustrates a method for detecting the occurrence of a word-usage anomaly, according to one embodiment of the invention. The method 800 further illustrates actions performed as part of step 608 of method 600. As described above, an anomaly represents a word that is being used more frequently than predicted by the word-usage probabilities in table 126. In one embodiment, the method 800 begins at step 802 and proceeds to step 804 where a word (or phrase) translated by the voice processing system (e.g., as part of step 606 of method 600) is added to word occurrence table 128. At step 806, the client 200 determines whether the observed word-usage frequency is higher than predicted by data from table 126. At step 808 the client determines whether an observed frequency of occurrence is sufficiently different than predicted to be considered a word-usage anomaly. For example, if the system detects that user has manually corrected a translated value to a word with a low probability in the word-usage table 106 multiple times. Alternatively, if the word has a probability sufficiently low such that the word would be removed from a list of candidate matches as part of a "fast match" described above, but is being used with a higher frequency, the word may be identified as an anomaly. If so, the method 800 then proceeds to step 812 where it returns a 'yes' to the query of step 608. After the step 812 then the method 800 terminates at step 814.

Returning to step 808, if the frequency of occurrence of the word processed in step 606 is not sufficient to be considered an anomaly, the method 800 proceeds to step 810. Step 810 returns a 'No' to the query of step 608. From step 810, the method 800 terminates at step 814.

Figure 9:
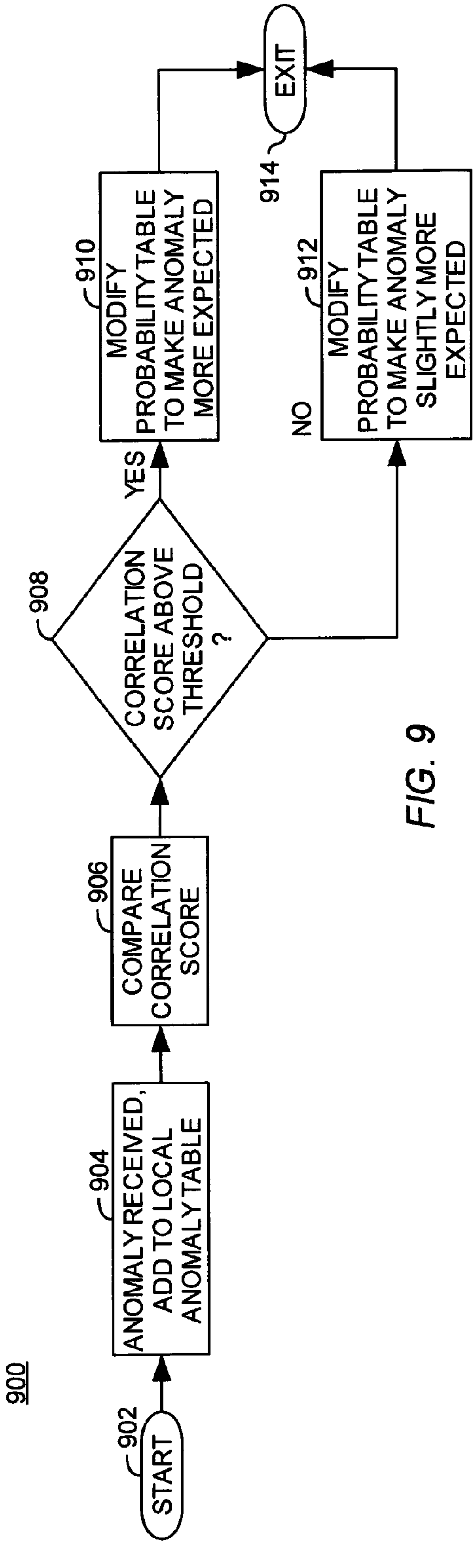
FIG. 9 is a flow chart illustrating a method for processing an indication of a word-usage anomaly, according to one embodiment of the invention.
Figure 10:
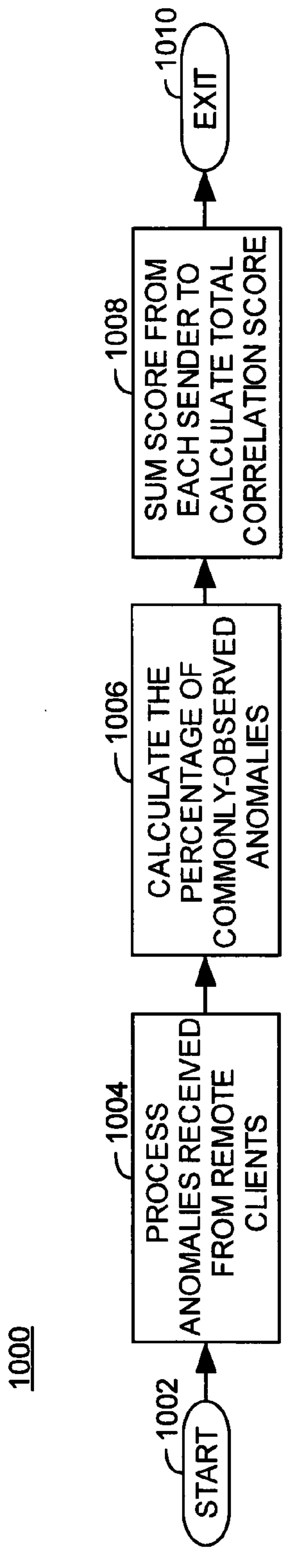
FIG. 10 is a flow chart illustrating a method for calculating a correlation score, according to one embodiment of the invention.

FIG. 9 illustrates a method for a client 200 to process word-usage anomalies received from a server 208, according to one embodiment of the invention. The method 900 further illustrates actions performed as part of step 616 of method 600. In one embodiment, the method 900 begins at step 902 and proceeds to step 904. At step 904, the client 200 records any anomalies received from the server 208 in client anomaly table 124. At step 906, client may be configured to calculate a correlation score. In one embodiment a correlation score is a value representing the likelihood that a word-usage anomalies observed by a first client 200 will occur a second client 200. Thus, the correlation score calculates how frequently both clients observe the same anomalies. FIG. 10 further illustrates a method for calculating a correlation score.

At step 908, the client 200 determines whether the correlation score is above a predefined threshold. For example, unless the first and second clients observe the same anomalies at fifty-percent of the time, over time, the client 200 will be more accurate by disregarding word-usage anomalies received from the poorly correlated client. If the correlation score is above the threshold, at step 910 the client 200 may modify the word-usage probability table 126 to reflect the remotely-observed anomaly. After step 910, the method 900 terminates at step 914.

If the correlation score does not exceed the threshold, then no modification is made to the client word probability table 126. Alternatively, in another embodiment, if the correlation score does not exceed the threshold, the method 900 then proceeds to step 912 where the word-usage probability may be modified to increase the probability of the remotely-observed anomaly, by a small increment. Doing so may allow a client to incrementally increase the probability of a word-usage anomaly, as it is observed by many clients, even where the clients share a poorly correlated anomaly history. After step 910, the method 900 terminates at step 914.

FIG. 10 illustrates a method for calculating a correlation score on a client 200. The method 1000 further illustrates actions performed as part of step 906 of method 600. The correlation score may be used to determine whether a local client is likely to observe the same anomalies as other, remote clients. For example, consider a network of clients that includes three individuals interacting with the voice recognition system: Bob, Sue and Joe. Joe may use different words in the course of his dictation than Bob and Sue. Thus, Joe may experience different anomalies than Bob or Sue. Conversely, Bob and Sue may use similar vocabulary in the course of their speech and, thus experience many similar anomalies. In this scenario, Bob and Sue will have a high correlation scores (i.e., they often observe the same word-usage anomalies) while neither Bob and Joe, nor Sue and Joe will a high correlation score (i.e., they observe the same anomalies only infrequently).

In one embodiment, the method 1000 begins at step 1002 and proceeds to step 1004. At step 1004, the client 200 may identify and processes anomalies received from remote clients (e.g., word-usage anomalies broadcast by server 208). At step 1006, the client 200 may calculate the percentage of commonly-observed anomalies. This percentage may represent the ratio of anomalies observed by the client $\mathbf{200}_1$ to anomalies observed by another client (e.g., $\mathbf{200}_2$). At step 1006, this percentage may be calculated by client $\mathbf{200}_1$ for each remote client $\mathbf{200}_{2\text{-}n}$ that has observed and reported an anomaly. At step 1008, the percentage of anomalies from each remote clients $\mathbf{200}_{2\text{-}n}$ is summed to determine a correlation score between the remote clients $\mathbf{200}_{2\text{-}n}$ and the client $\mathbf{200}_1$ calculating the correlation score. Once calculated, the client $\mathbf{200}_1$ may use the correlation score to determine whether to modify a word-usage probability, based on an anomaly reported by a remote client $\mathbf{200}_{2\text{-}n}$.

Figure 11:
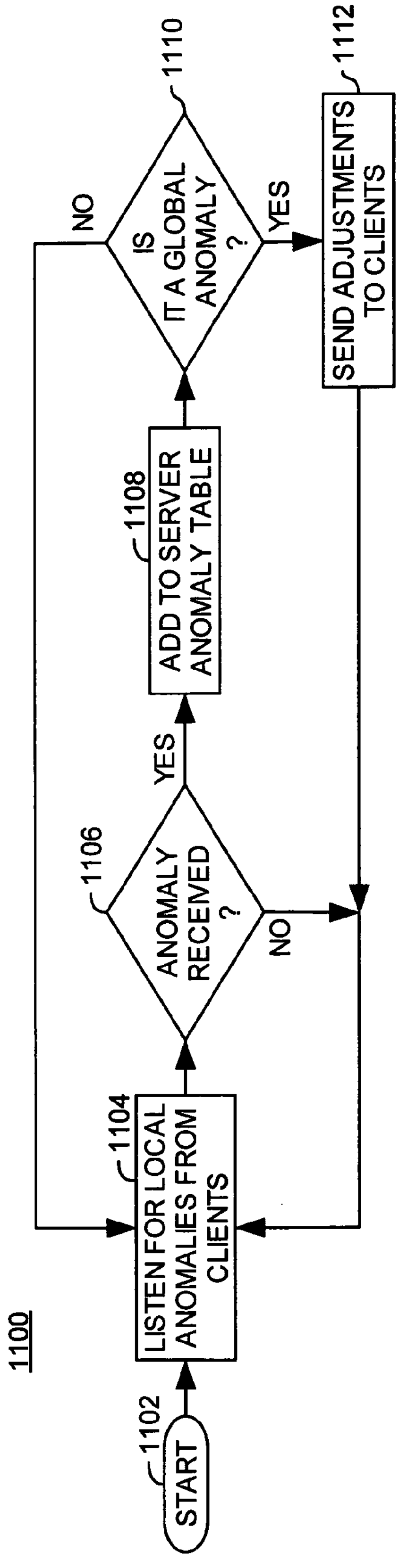
FIG. 11 is a flow chart illustrating a method for detecting word-usage anomalies and distributing such anomalies to users of a voice processing system, according to one embodiment of the invention.

FIG. 11 illustrates a method 1100 for a server 208 to process word-usage anomalies, according to one embodiment of the invention. For example, the server 208 may receive word-usage anomalies sent from clients 200. Later, the server 208 may be configured to distribute word-usage anomalies to other clients 200 (e.g., when another client 200 is first initialized, according to the method of FIG. 8). In one embodiment the method 1100 begins at step 1102 and proceeds to step 1104. At step 1104, the server 208 receives word-usage anomaly anomalies 204 form a client 200.

At step 1106, a query is performed to determine whether a word-usage anomaly 204-$\mathbf{204}_n$ has been received from a client 200-$\mathbf{200}_n$. If not, the method 1100 returns to step 1104. Thus, the anomaly detection process on the server 208 may repeat (or remain idle) until receiving a word-usage anomaly. Once an anomaly is received, the method 1100 proceeds to step 1108. At step 1108, the server records the anomaly in anomaly table 210.

At step 1110, the sever 208 may be configured to determine whether the anomaly is a "global anomaly" 206. That is, the server 208 may be configured to determine whether the word-usage anomaly is being observed by many clients within a similar time-frame. For example, returning to hurricane Ivan example, multiple users may have begun dictating the word "Ivan" concurrently. As described above, this particular word-usage anomaly may be simultaneously observed by clients 200 processing calls at a call-center, and by clients 200 translating dictation from claims processors and adjustors for a given insurance company. During the course of processing calls, individual clients 200 may observe that the word "Ivan" was an anomaly. These clients begin reporting the anomaly to the server 208 (e.g., as part of step 612 of method 600).

Accordingly, at step 1112, when multiple clients 200 begin to observe and report the same word-usage anomaly, the server 208 may broadcast an indication to each of the clients connected to the network 144. In one embodiment, when a client 200 receives a global anomaly, it may adjust a word-usage probability table 126 to reflect the anomaly, without calculating a correlation score. After completing step 1112, the method 1100 returns to step 1104 to monitor for anomalies from clients 200-$\mathbf{200}_n$. Similarly, if the anomaly is not a global anomaly the method 1100 also returns to step 1104 to listen for local anomalies from clients $\mathbf{200}_1$-$\mathbf{200}_n$.

In some embodiments, the word-usage probability of a word adjusted for an anomaly may be configured to erode or decay, over time. Alternatively, an adjustment may expire after a predetermined period. That is, just as the word-usage of an anomaly may fade over time, the probability used by the language model may similarly be adjusted. An illustrative example follows from the hurricane Ivan scenario, described above. Over time, use of the word "Ivan" by callers, claims-representatives and adjusters of the insurance company decreased, and the probability of word-usage for the word "Ivan" trended back towards its original value.

Figure 12:
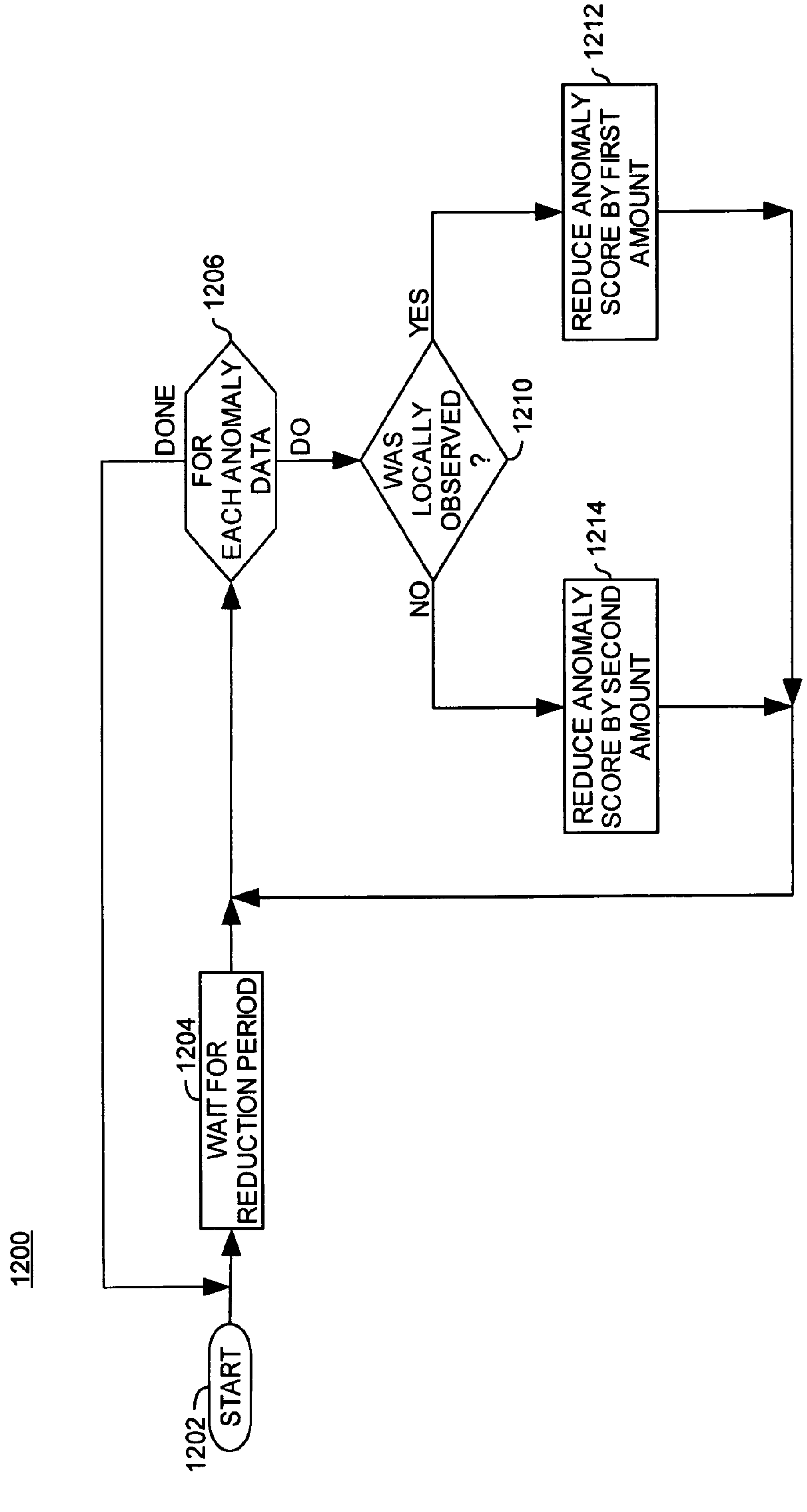
FIG. 12 is a flow chart illustrating a method for eroding the increased word-usage probability regarding an anomaly, according to one embodiment of the invention.

FIG. 12 illustrates a method 1200 for restoring the probability of a word-usage for a given word after being adjusted in response to a word-usage anomaly, according to one embodiment of the invention. The method 1200 decreases the word-usage probability of an observed anomaly word over time. The method 1200 begins at step 1202 and proceeds to step 1204. At step 1204, a reduction period elapses. After the reduction period, a loop (includes steps 1210, 1214 and 1212) may be performed. Illustratively, the loop is iterated for each anomaly in a client anomaly table 124. At step 1210, a query determines whether the word-usage anomaly has been observed locally. If so, then at step 1212 where the word-usage probability recorded for the anomaly may be reduced by a first amount (or left unchanged). If the anomaly was not locally observed the method 1200 proceeds to step 1214 where the word-usage probability for the anomaly is reduced by a second amount. For example, over time, if the anomaly has only been observed remotely, it may decay at a faster rate than one observed locally. Once the loop of step 1206 is completed the method 1200 returns to step 1204 to wait for the reduction period.

Alternatively, once adjusted to reflect an anomaly, the word-usage probability may be configured to revert to an original value after the predefined period. In such a scenario, as long as the word-usage anomaly continues to be observed, the predefined period may be reset. Thus, until a period elapses without observing the word usage anomaly, the higher probability for the word associated with the anomaly may remain in effect.

CONCLUSION

As described above, embodiments of the invention provide a voice recognition system configured to dynamically recognize sudden changes in word-usage. This may be particularly useful where the word-usage probability of an uncommon word suddenly changes, due to the occurrence of an external event. Because many voice recognition systems employ a tiered approach, uncommon words may be excluded by an initial fast-match, based on a low probability of occurrence. Embodiments of the invention may be configured to recognize such an anomaly and, temporarily, increase the probability for the word to account for the anomalous word-usage. In a particular embodiment, different users may calculate a correlation score to determine how likely an anomaly observed by one user will ultimately be observed by another.

Furthermore, embodiments of the invention include a distributed voice recognition system configured to share observed anomalies with a plurality of clients. Additionally, because an anomaly may fade as quickly as it appears, the word-usage probability associated with an anomaly may be decreased after being initially adjusted to account for an observed word-usage anomaly.

While the foregoing directed to embodiments of the present invention, other and further embodiments of the invention may be devised without departing from the basic scope thereof, and the scope thereof is determined by the claims that follow.

What is claimed is:

1. A computer-implemented method for increasing the accuracy of a voice recognition system, comprising:

initiating a voice processing session for a first user, wherein the voice processing session is configured to match a voice pattern derived from one or more words spoken by the first user with entries in a word-usage probability table, based on a probability of the one or more words being spoken by the first user;

during the voice processing session initiated for the first user, monitoring for an occurrence of a word-usage anomaly, wherein the word-usage anomaly occurs when an observed usage frequency for a given one or more words differs, by a predetermined magnitude, from an expected frequency recorded in the word-usage probability table for the given one or more words;

in response to the occurrence of the word usage anomaly, increasing the expected frequency for the given one or more words in the word-usage probability table, wherein the increased expected frequency for the given one or more words in the word-usage probability table is configured to expire, after a predetermined period of time;

transmitting an indication of the observed anomaly to a voice processing session initiated for a second user; and monitoring, by a server, respective voice processing sessions for each of a plurality of users, including at least the first user and the second user, wherein the server is configured to:

(i) monitor the occurrence of word-usage anomalies for each of the voice processing sessions, (ii) record anomalies observed by each of the voice processing sessions in a server anomaly table, and (iii) broadcast an indication of a global anomaly to each of the voice processing sessions, wherein the global anomaly comprises an anomaly that is observed independently by at least two of the voice processing sessions.

2. The computer-implemented method of claim 1, wherein the probability of the one or more words being spoken by the first user are determined according to an n-gram model, and wherein the probabilities in the word-usage probability table comprise an n-gram probability regarding a sequence of n words.

3. The computer-implemented method of claim 1, further comprising:

determining, by the voice processing system initiated for the second user, a correlation score indicating how often anomalies observed by the first user were also observed by the second user; and depending on the correlation score, adjusting the expected frequency for the word corresponding to the observed anomaly in a word-usage probability table initialized for the voice processing session of the second user.

4. The computer-implemented method of claim 1, wherein the word-usage probability table is initialized for the second user using at least one indication of a word-usage anomaly observed by the voice processing session of the first user.

5. The computer-implemented method of claim 1, wherein monitoring for an occurrence of a word-usage anomaly comprises monitoring corrections made to a word selected by the voice processing session to match with a given voice pattern that are entered manually by the user.

6. The computer-implemented method of claim 1, wherein the increased expected frequency for the given one or more words in the word-usage probability table is configured to diminish, over time, to return the increased expected frequency to the original expected frequency.

* * * * *